(12) United States Patent
Hsu

(10) Patent No.: US 10,761,573 B2
(45) Date of Patent: Sep. 1, 2020

(54) HINGE MODULE FOR A FOLDABLE TYPE DEVICE

(71) Applicant: JARLLYTEC CO., LTD., New Taipei (TW)

(72) Inventor: Yu-Tsun Hsu, New Taipei (TW)

(73) Assignee: JARLLYTEC CO., LTD., New Taipei (TW)

( * ) Notice: Subject to any disclaimer, the term of this patent is extended or adjusted under 35 U.S.C. 154(b) by 0 days.

(21) Appl. No.: 16/405,768

(22) Filed: May 7, 2019

(65) Prior Publication Data
US 2020/0103935 A1    Apr. 2, 2020

(30) Foreign Application Priority Data

Sep. 27, 2018  (TW) .............................. 107134205 A

(51) Int. Cl.
*G06F 1/16*    (2006.01)
*G09F 9/30*    (2006.01)

(52) U.S. Cl.
CPC .......... *G06F 1/1681* (2013.01); *G06F 1/1616* (2013.01); *G09F 9/301* (2013.01)

(58) Field of Classification Search
CPC .............................. G06F 1/1681; G09F 9/301
See application file for complete search history.

(56) References Cited

U.S. PATENT DOCUMENTS

| | | | | |
|---|---|---|---|---|
| 9,250,733 B2 * | 2/2016 | Lee | ............ | H04M 1/02 |
| 9,696,763 B2 * | 7/2017 | Mok | ............ | G09F 9/301 |
| 9,826,626 B2 * | 11/2017 | Myeong | ............ | H04M 1/0268 |
| 10,423,019 B1 * | 9/2019 | Song | ............ | G06F 1/1681 |
| 10,536,566 B1 * | 1/2020 | Cheng | ............ | G06F 1/1616 |
| 10,659,584 B2 * | 5/2020 | Mok | ............ | G06F 1/1656 |
| 10,694,623 B2 * | 6/2020 | Park | ............ | G06F 1/1681 |
| 2016/0085265 A1 * | 3/2016 | Park | ............ | G06F 1/1681 361/807 |
| 2019/0174645 A1 * | 6/2019 | Jeon | ............ | H05K 5/0226 |

FOREIGN PATENT DOCUMENTS

| | | |
|---|---|---|
| CN | 103576775 A | 2/2014 |
| CN | 105788452 A | 7/2016 |
| CN | 106205385 A | 12/2016 |
| CN | 106255935 A | 12/2016 |
| CN | 103034293 B | 7/2018 |

* cited by examiner

*Primary Examiner* — Jeffrey O'Brien
(74) *Attorney, Agent, or Firm* — Muncy, Geissler, Olds & Lowe, P.C.

(57) ABSTRACT

The present invention provides a hinge module for a foldable-type device, one end surface of which is respectively connected to a first housing and a second housing, and another end surface of which is connected to a flexible display so as to have the flexible display folded when the first housing and the second housing is rotated. The hinge module comprises a base and a first sliding mechanism, wherein the base is provided between the first and second housings, and the first sliding mechanism comprises a first sliding cover, a supporting member and a left four-linkage-mechanism and a swinging member. When the first and second housings are rotated to move the left four-linkage-mechanism and the swinging member, the first sliding cover is moved in a linkage way, and one supporting portion of the supporting member is moved by an angle to accommodate the curved part of the flexible display.

17 Claims, 9 Drawing Sheets

HINGE MODULE FOR A FOLDABLE TYPE DEVICE

FIELD OF THE INVENTION

The present invention relates to a hinge device, and more particularly to a hinge module for a foldable type electronic device.

BACKGROUND OF THE INVENTION

The conventional foldable electronic devices, such as a foldable display, mainly connects the sides of the support members of display units through a split shaft or a multi-axis shaft to form a pivoting connection, thereby making the flexible display or each display unit folded or unfolded in an opposite direction. Since the current electronic devices are mainly designed to be thinner in order to be carried by users, the spacing between two bodies that can be reserved for the hinge would become narrower and narrower, and the dimensional requirements for the hinge are bound to be reduced.

For example, the Chinese Patent entitled with "A Foldable display" with No. CN105788452A has disclosed a foldable structure of a hinge, which mainly has a first body and a third body of the hinge respectively connected to a first supporting member and a second supporting member, and has the first supporting member and the second supporting member combined with a flexible display module. Thus, the flexible display module on the first supporting member and the second supporting member are folded after the first body and the third body are turned relative to the second body. However, the first body and the third body of the hinge foldable structure mentioned above are turned with reference to the two ends of the second body is. Since it is necessary to provide a structure on the second body that allows the first and third bodies to turn, the spacing between the two bodies that can be reserved for the hinge cannot be effectively reduced. This structural design will make the overall volume larger, which is not only unfavorable to the overall design of the electronic device, but also does not meet the market requirement for the overall volume gradually to be lighter and thinner.

As shown in the three patents of CN103576775A, CN106205385A and U.S. Pat. No. 9,250,733B, the two bodies are formed in a relatively foldable manner by a biaxial shaft or an approximately biaxial-shaft structure. The "support structure" in these three patents has its one end therein pivoted through a "physical shaft" and the other end movable. When the entire "foldable device" is folded, each supporting structure in the two bodies is driven by another force exerting member, for example, spring, tension spring, magnetic iron, and torsion spring so as to form an accommodation space therein for accommodating the curved central part of the flexible display, and the unfolded central part of the flexible display is supported by the respective support structures when the entire foldable device is unfolded. Moreover, the Chinese Patent entitled with "A Foldable device" with No. CN106255935A and the Chinese Patent entitled with "A display System" with No. CN103034293B have disclosed that the linkage set is formed by one or two linkages to push "a support structure" pivoted by the "physical shaft" to produce movement, so as to achieve the effect of reducing the spacing to accommodate the "flexible portion of the flexible screen".

However, the support structures disclosed in these five patents such as CN103576775A, CN106205385A, U.S. Pat. No. 9,250,733B, CN106255935A and CN103034293B all use the "physical shaft" as a pivoting member. In order to achieve the transmission effect, such arrangement requires space for assembly to easily increase the overall thickness, so that the overall volume cannot be effectively reduced, and even if the thickness is reduced, it is limited by the existence of "the physical shaft" so as to affect the overall appearance. In view of this, in order to provide a structure different from prior art and to improve the above disadvantages, the inventor has continuously research, and the present invention is provided.

SUMMARY OF THE INVENTION

An object of the present invention is to provide a hinge module capable solving the technical problem that the overall size of the conventional shaft folding structure is too large and is not conducive to the overall design by pushing the sliding cover and the housing to produce displacement through a four-linkage-mechanism, a gear set and a lever during the overall folding process of the device of the present invention, so as to generate a compensated conversion of the path and length to compensate the difference between the radius of curvature formed at the bending portion of the flexible display and the radius of curvature between the two housings, thereby the support part is offset to accommodate the structure of the bent portion of the flexible display. Such arrangement can effectively reduce the spacing between the two bodies when being folded, so as to reduce the overall volume and such arrangement is beneficial to the overall design and can meet the market requirement for thinner structure, and such arrangement can produce a stable transmission effect due to the structure mentioned above with reduced overall thickness. The support member of the present invention adopts a seesaw-like structure without being pivoted by a physical shaft, so that the accommodating space can accommodate the curved central part of the flexible display when the device of the present invention is folded, and the unfolded central part of the flexible display can be supported when the device of the present invention is unfolded.

In order to fulfill above objects, the hinge module for a foldable type device of the present invention has one end surface simultaneously connected with a flexible display to have the flexible display relatively folded. The hinge module comprising a base and a first sliding mechanism, where one end of the base has a first pivoting hole and a second pivoting hole; the first sliding mechanism comprises: a first sliding cover, a supporting member, a four-linkage-mechanism and a swinging member. One end of the first sliding cover has a limiting space, and another end of the first sliding cover has a first limiting part; wherein one end of the supporting member is elastically limited by way of sliding along a curved path in the limiting space, and another end of the supporting member has a supporting part; the four-linkage-mechanism includes a first linkage member, a second linkage member, and a third linkage member; where one end of the first linkage member is pivotally connected to the first pivoting hole by a first pivot, one end of the second linkage member is pivotally connected to the second pivoting hole by a second pivot, and another end of the second linkage member is pivotally connected to one end of the third linkage member by a third pivot, another end of the third linkage member is pivotally connected to another end of the first linkage member by a fourth pivot; the swinging member is coupled to the third linkage member in a synchronous rotation, wherein one end of the swinging member is provided with a first lever, and the first lever passes through the first linkage member and is connected to the first limiting part of the first sliding cover; thereby when the first sliding mechanism and the base are rotated in an opposite direction to move the four-linkage-mechanism, the first sliding cover is moved to offset the supporting part of the supporting member by an angle, so as to accommodate the curved part of the flexible display.

In an implementation, another end surface of the hinge module is respectively connected to a first housing and a second housing for moving the first housing and the second housing in a linkage way, so as to have the first housing and the second housing rotated in an opposite direction; the base is located between the first housing and the second housing; the four-linkage-mechanism is a left four-linkage-mechanism, and the first sliding cover is connected to the first housing; when the first sliding mechanism and the base are relatively rotated to move the left four-linkage-mechanism, the first sliding cover is moved in a linkage way to move the first housing synchronously.

In an implementation, wherein the first sliding cover includes a first cover body and a first sliding block, the first cover body is connected to the first housing, the first sliding block has the limiting space, and the limiting space includes a limiting slot and a curved guiding slot in communication with each other, the limiting slot is provided with an elastic member therein, and the supporting member has a first curved rail for correspondingly being located in the curved guiding slot to relatively slide along a curved path, one end of the first curved rail is connected to the supporting part, and another end of the first curved rail has a hook portion for pressing against and limiting the elastic member, and the first linkage member is further connected to a first casing by a connecting block for providing space and protecting the movements of the left four-linkage-mechanism and the swinging member; thereby when the first sliding mechanism and the base are relatively rotated to move the left four-linkage-mechanism, the first casing is slide relative to the first housing.

In an implementation, wherein another end of the first sliding cover has a first guiding rail through which the fourth pivot passes and which guides the fourth pivot.

In an implementation, wherein the swinging member is pivotally connected to the first linkage member by a fifth pivot, and the fifth pivot passes through the first guiding rail and which guides the fifth pivot.

In an implementation, wherein the swinging member has a first engaging portion that is coaxial with the fifth pivot, the third linkage member has a second engaging portion that is coaxial with the fourth pivot, the second engaging portion is engaged with the first engaging portion to have the third linkage member turned synchronously together with the swinging member.

In an implementation, wherein one side of the base has a step portion for restricting the supporting part from being offset by an angle.

In an implementation, wherein another end of the first linkage member has a first curved rail for accommodating and limiting the first lever of the swinging member.

In an implementation, the present invention further comprises a second limiting part, another four-linkage-mechanism and a second lever, where the second limiting part is located at another end of the first sliding cover; the another four-linkage-mechanism includes a first linkage bar and a second linkage bar, one end of the first linkage bar is pivotally connected to the first pivot hole by a sixth pivot, and one end of the second linkage bar is pivotally connected to a second pivot hole by a seventh pivot, another end of the second linkage bar is pivotally connected to one end of the third linkage member by an eighth pivot, and another end of the third linkage member is pivotally connected to another end of the first linkage bar by a ninth pivot, the ninth pivot is coaxial with the fourth pivot; the second lever is located at one end of the swinging member, the second lever is coaxial with the first lever, the second lever passes through the first linkage bar and connects to the second limiting part of the first sliding cover.

In an implementation, wherein another end surface of the hinge module is respectively connected to a first housing and a second housing for moving the first housing and the second housing in a linkage way, so as to have the first housing and the second housing rotated in an opposite direction; the base is located between the first housing and the second housing; the four-linkage-mechanism is a left four-linkage-mechanism, and the another four-linkage-mechanism is a right four-bar mechanism, the first sliding cover is connected to the first housing; thereby when the first sliding mechanism and the base are relatively rotated to move the left and right four-linkage-mechanisms, the first sliding cover is moved in a linkage way together with the first housing.

In an implementation, wherein the first sliding cover includes a first cover body and a first sliding block, the first cover body is connected to the first housing, the first sliding block has the limiting space, and the limiting space includes a limiting slot and an curved guiding slot in communication with each other, the limiting slot has an elastic member, and the supporting member has a first curved rail for correspondingly being accommodated in the curved guiding slot in a sliding way along a curved path, one end of the first curved rail is connected to the support part, and another end of the first curved rail has a hook portion for pressing against and limiting the elastic member, and the first linkage bar and the first linkage member are further connected with a first casing by a connecting block for providing space and protecting the actions of the left four-linkage-mechanism, the right four-linkage-mechanism and the swinging member; thereby when the first sliding mechanism and the base are relatively rotated to move the left and right four-linkage-mechanisms, the first housing cover is relatively slide with the first casing.

In an implementation, wherein one end of the first sliding cover has a second guiding rail through which the ninth pivot passes and which guides the ninth pivot.

In an implementation, wherein the swinging member pivotally connects the first linkage bar with an Nth pivot, the Nth pivot is coaxial with the fifth pivot, and the Nth pivot passes through the second guiding rail, and by which the Nth pivot is guided.

In an implementation, wherein another end of the first linkage bar has a second curved rail for accommodating and limiting the second lever of the swinging member.

In an implementation, wherein the sixth pivot is coaxially connected to a first gear.

In an implementation, the present invention further comprises a second sliding mechanism, wherein the second sliding mechanism is structurally corresponding to the first sliding mechanism, wherein the second sliding mechanism and the first sliding mechanism are symmetrically provided at two ends of the base, and the second sliding mechanism has a second gear for engaging the first gear, so as to have the second sliding mechanism rotated in an opposite direction relative to the first sliding mechanism.

The present invention will be understood more fully by reference to the detailed description of the drawings and the preferred embodiments below.

DETAILED DESCRIPTIONS OF PREFERRED EMBODIMENTS

Figure 1:
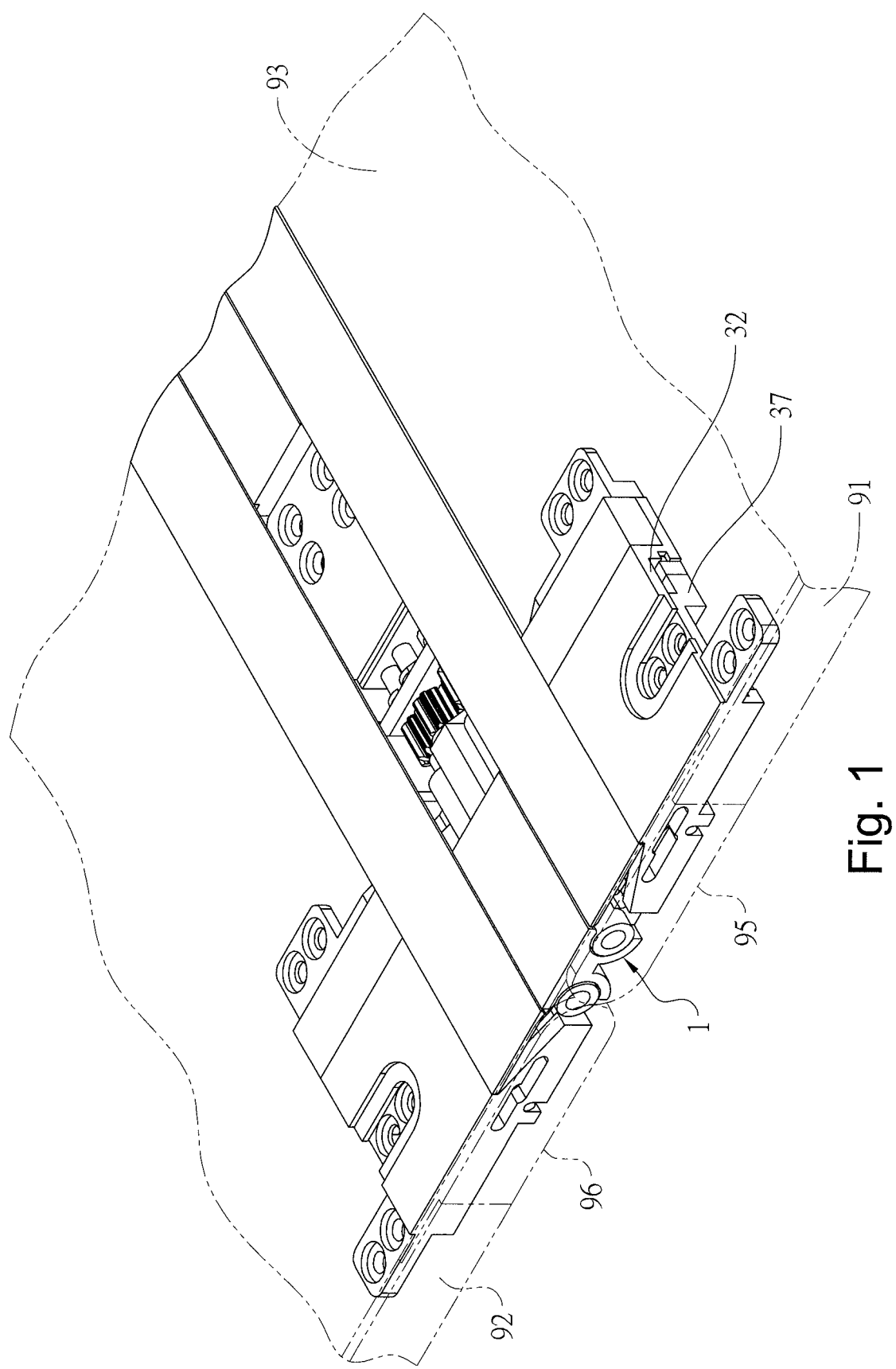
FIG. 1 is a perspective view showing a preferred embodiment of a hinge module of the present invention when the first housing is connected with the second housing.
Figure 8:
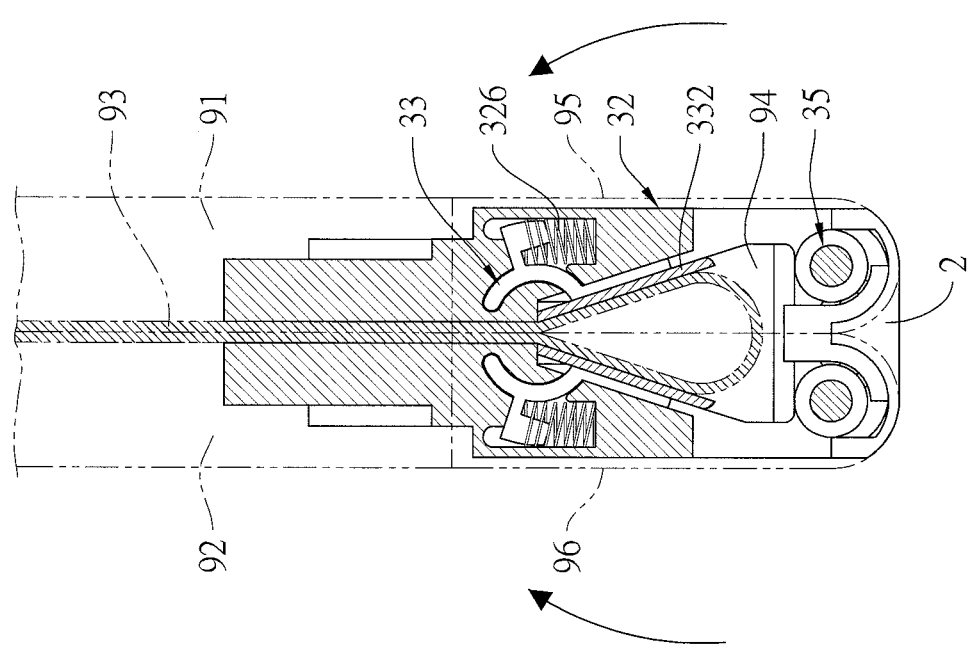
FIG. 8 is a cross-sectional view of the present invention of FIG. 7 when being folded.
Figure 10:
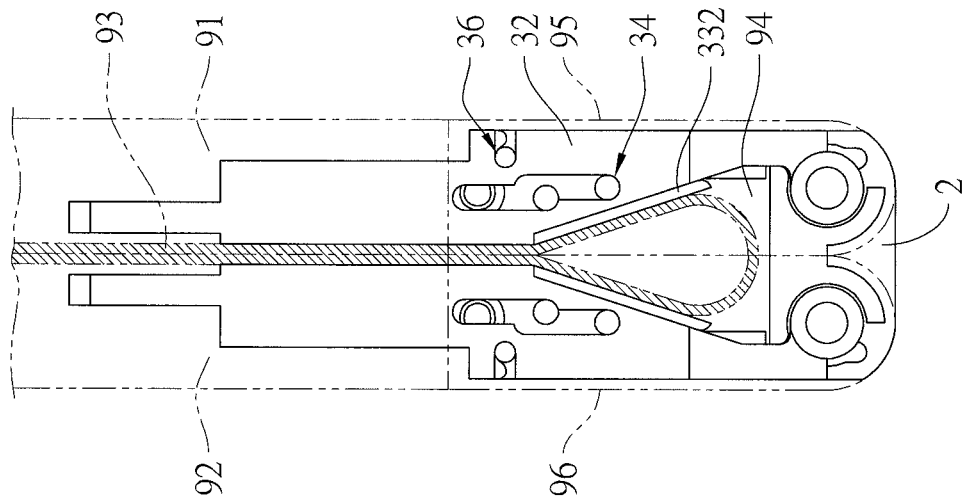
FIG. 10 is a cross-sectional view of the present invention of FIG. 6 when being folded.
Figure 9:
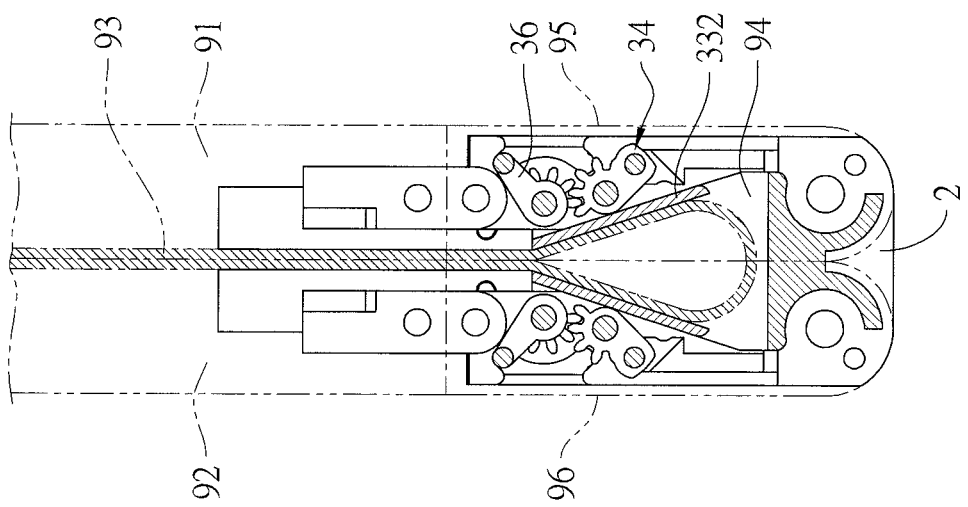
FIG. 9 is a cross-sectional view of the present invention of FIG. 5 when being folded.
Figure 11:
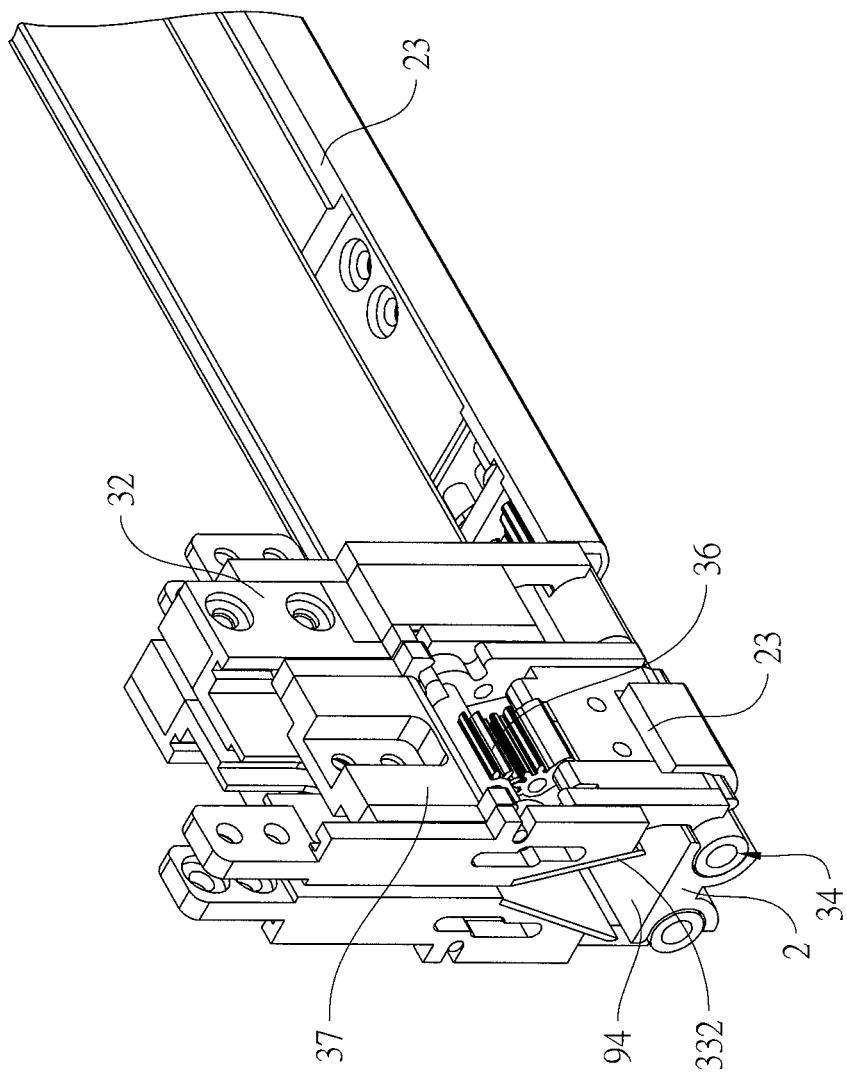
FIG. 11 is a perspective view showing a preferred embodiment of the hinge module of the present invention when being folded.

Referring to FIG. 1, one end surface of the hinge module 1 for a foldable type device of the present invention is simultaneously connected to two halves of a flexible display 93, and another end surface of the hinge module 1 is respectively connected to a first housing 91 and a second housing 92 so as to have the first housing 91 and the second housing 92 moved in a linkage way, and have the first housing 91 and the second housing 92 rotated in an opposite direction, so as to have the flexible display 93 folded or unfolded in an opposite direction. As shown in FIG. 8, when the device of the present invention is folded, an accommodating space 94 is formed at the intersection of the first housing 91 and the second housing 92 to accommodate the curved central part of the flexible display 93.

Figure 2:
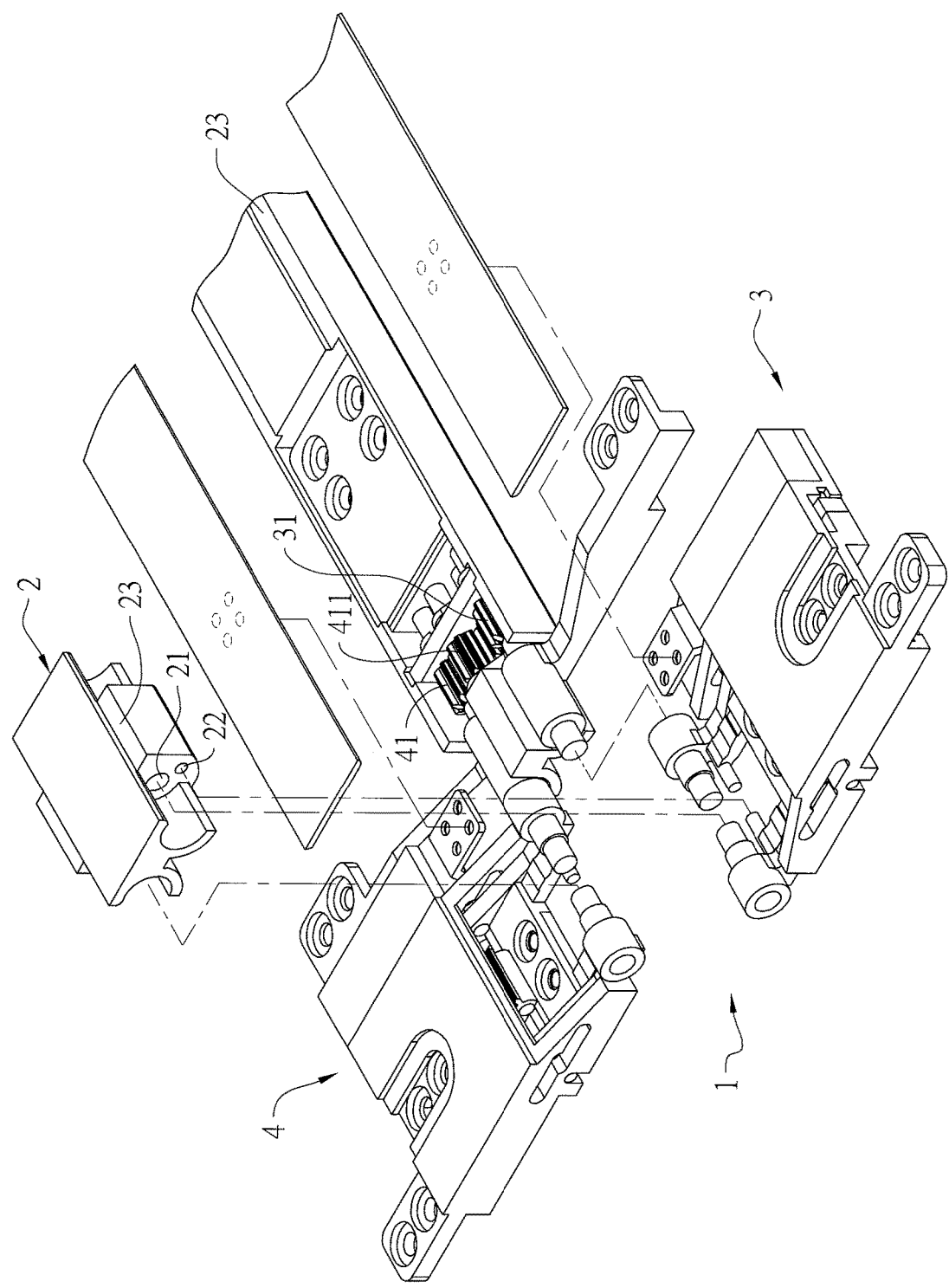
FIG. 2 is an exploded view of a part of a preferred embodiment of the hinge module of the present invention.
Figure 3:
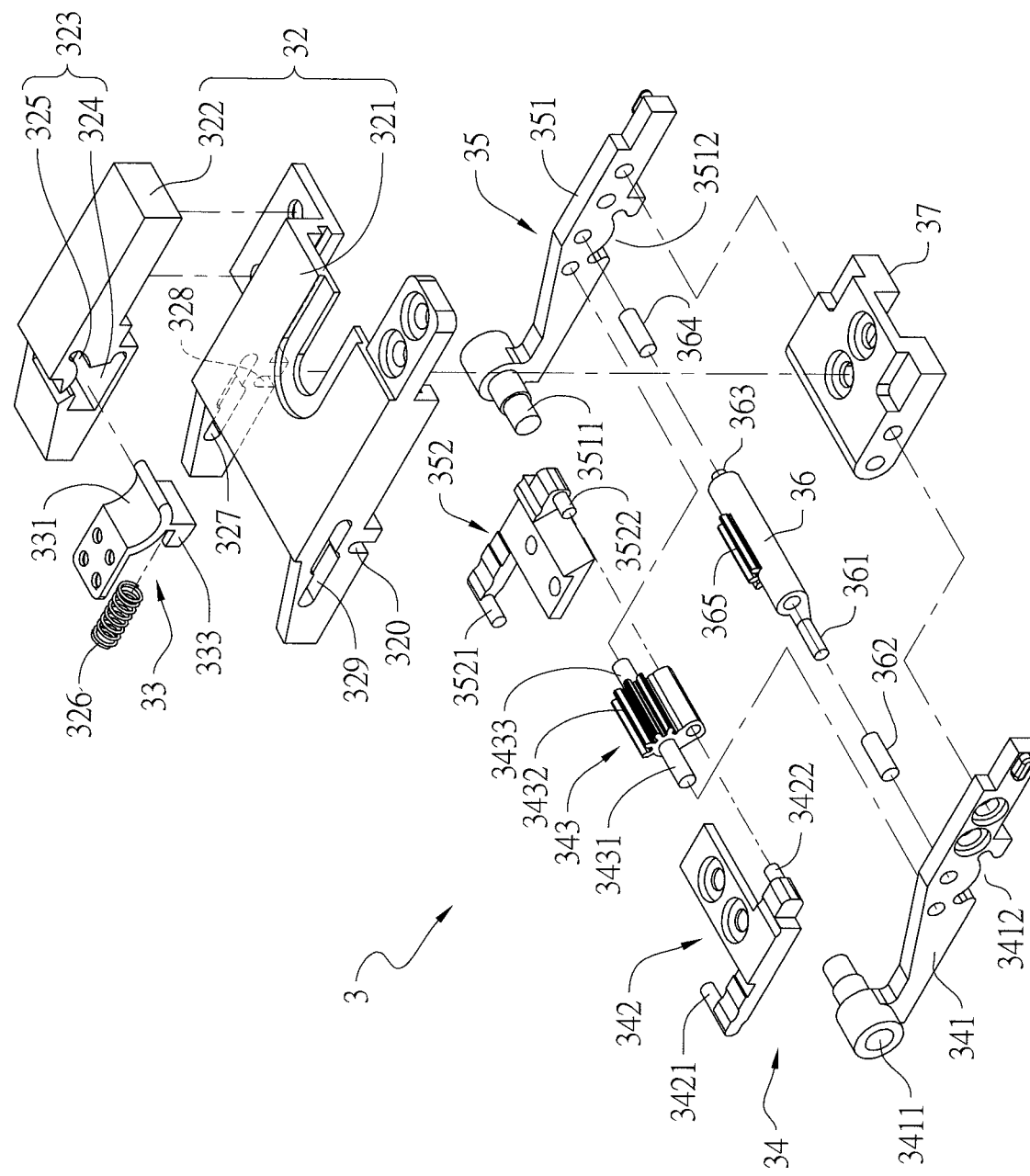
FIG. 3 is an exploded view of a part of a preferred embodiment of the hinge module of the present invention.
Figure 4:
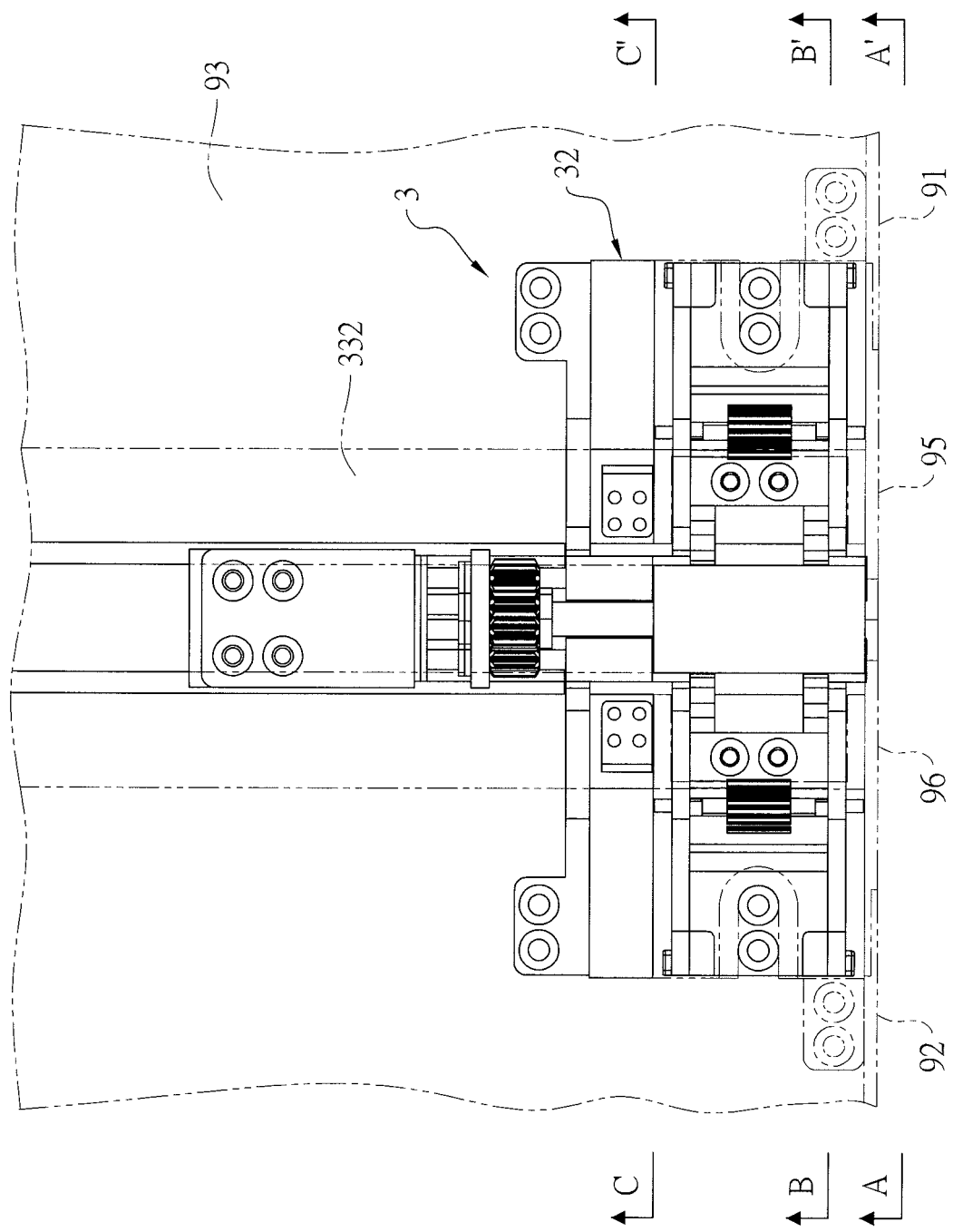
FIG. 4 is a top view showing the preferred embodiment of the hinge module of the present invention when being unfolded.
Figure 5:
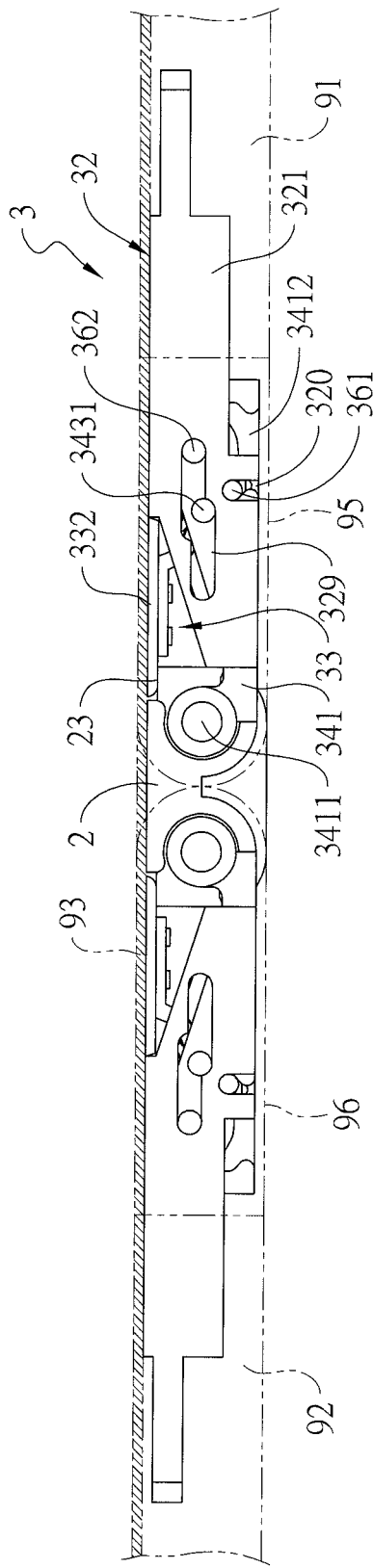
FIG. 5 is a cross-sectional view taken along line A-A' of FIG. 4.
Figure 6:
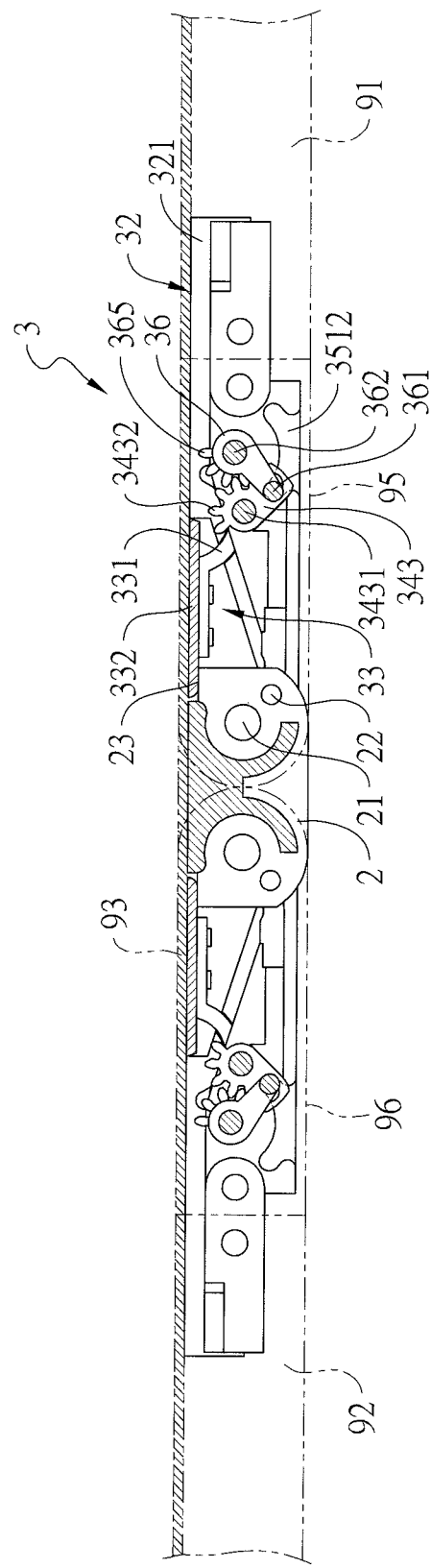
FIG. 6 is a cross-sectional view taken along line B-B' of FIG. 4.
Figure 7:
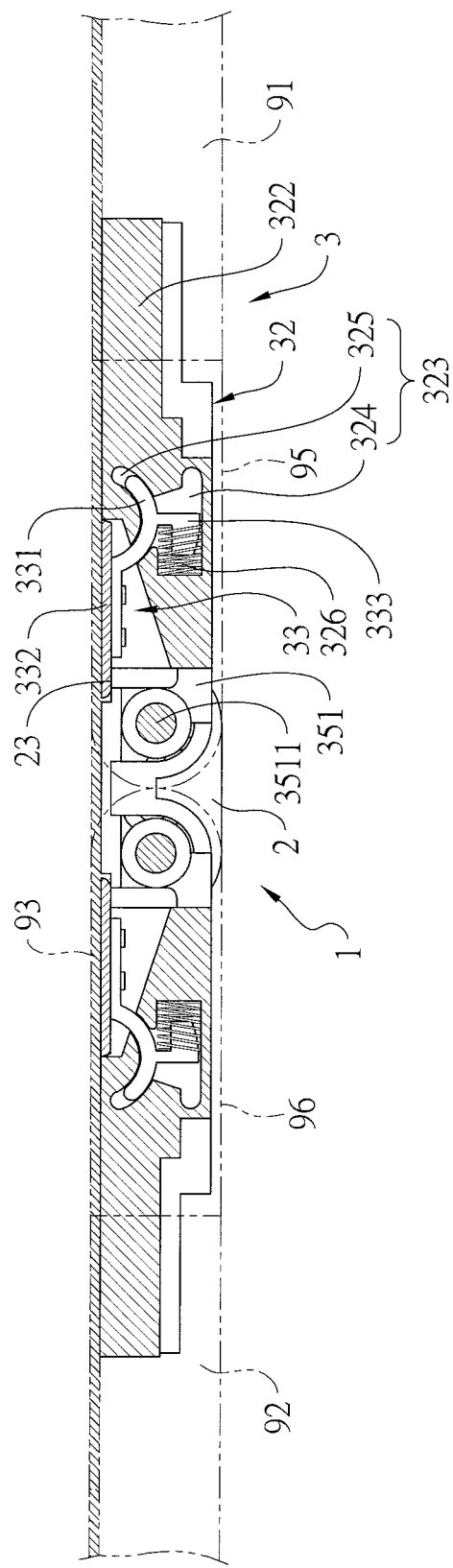
FIG. 7 is a cross-sectional view taken along line C-C' of FIG. 4.

As shown in FIG. 2, the preferred embodiment of the hinge module 1 for a foldable type device of the present invention comprises a base 2, a first sliding mechanism 3 and a second sliding mechanism 4. The base 2 is provided between the first housing 91 and the second housing 92. One end of the base 2 is provided with a first pivoting hole 21 and a second pivoting hole 22. Another end of the base 2 is provided with two pivoting holes opposite to the first pivoting hole 21 and the second pivoting hole 22, and the two sides of the base 2 respectively are provided with a step portion 23. The first sliding mechanism 3 is pivotally connected to the first pivoting hole 21 and the second pivoting hole 22, and the second sliding mechanism 4 is pivotally connected to the other two pivoting holes, so as to have the first sliding mechanism 3 and the second sliding mechanism 4 symmetrically provided at two ends of the base 2. In addition, the first sliding mechanism 3 has a first gear 31, and the second sliding mechanism 4 has a second gear 41. These two gears can be engaged with each other, and the second gear 41 can also be engaged with the first gear 31 through a set of intermediate gear 411 (for example, a spur gear set, a helical gear set, and an umbrella/a crown gear set) so as to have the second sliding mechanism 4 and the first sliding mechanism 3 are rotated in an opposite direction. In the present embodiment, the first sliding mechanism 3 and the second sliding mechanism 4 have the same structure, and the following description will be made by taking the first sliding mechanism 3 as an example.

As shown in FIGS. 3-7, the first sliding mechanism 3 includes a first sliding cover 32, a supporting member 33, a left four-linkage-mechanism 34, a right four-linkage-mechanism 35, and a swinging member 36. The first sliding cover 32 includes a first cover body 321 and a first sliding block 322. The first cover body 321 is connected to the first housing 91. The first sliding block 322 is connected to one side of the first cover body 321. The first sliding block 322 has a limiting space 323, and the limiting space 323 includes a limiting slot 324 and a curved guiding slot 325 in communication with each other. The limiting slot 324 has a compression spring therein, and the compression spring is used as an elastic member 326. The two ends of the first cover body 321 are provided respectively with a vertical plate, wherein one end of the vertical plate has a second guiding rail 327 and a transverse through slot thereon, and the transverse through slot is used as the second limiting portion 328. The vertical plate provided at another end of the first cover body 321 has a first guiding rail 329 and another transverse through slot that is coaxial with the second limiting portion 328. The another transverse through slot is used as a first limiting portion 320, and the first guiding rail 329 is parallel to the second guiding rail 327.

The supporting member 33 is a plate having substantially the same thickness as the first sliding block 322. The support member 33 has a first curved rail 331 correspondingly accommodated to the curved guiding slot 325 of the first sliding block 322, so that have the first curved rail 331 slide along a curved path relative to the curved guiding slot 325; one end of the first curved rail 331 is connected to a long plate, and the long plate is used as a supporting portion 332; another end of the first curved rail 331 is provided with a hook portion 333, and the hook portion 333 is extended into the limiting slot 324 for pressing and limiting the elastic member 326.

The left four-linkage-mechanism 34 includes a first linkage member 341, a second linkage member 342, and a third linkage member 343. The first linking member 341 is an elongated plate. One end of the first linking member 341 is pivotally connected to the first pivoting hole 21 of the base 2 by a first pivot 3411, and a plate surface of another end of the first linkage member 341 is provided with a first curved rail 3412. The second linking member 342 is an elongated plate block, and one end of the second linkage member 342 is pivotally connected to the second pivoting hole 22 of the base 2 by a second pivot 3421, and another end of the second linkage member 342 is pivotally connected to one end of the third linkage member 343 by a third pivot 3422, and another end of the third linkage member 343 is pivotally connected to another end of the first linkage member 341 by a fourth pivot 3431. The fourth pivot 3431 passes through the first guiding rail 329 of the first sliding cover 32 to be moved within the first guiding rail 329. The third linkage member 343 is provided with a plurality of teeth coaxial with the fourth pivot 3431, and the plurality of teeth are used as the second engaging portion 3432; wherein the first pivot and second pivot may also be provided on the base; the first and second pivoting holes may also be respectively provided on the first linkage member and the second linkage member, the connections between these three linkage members can be carried out by means other than the use of pivoting, and they are also be connected in a way of corresponding protruding-recessing structures.

The right four-linkage-mechanism 35 includes a first linkage bar 351, a second linkage bar 352. One end of the first linkage bar 351 is pivotally connected to the first pivot hole 21 by a sixth pivot 3511. The sixth pivot 3511 is coaxially connected to the first gear 31, and plate surface of the another end of the first linkage bar 351 is provided with a second curved rail 3512. One end of the second linkage bar 352 is pivotally connected to the second pivot hole 22 by a seventh pivot 3521, and the another end of the second linkage bar 352 is pivotally connected to one end of the third linkage member 343 by an eighth pivot 3522. The another end of the third linkage member 343 is pivotally connected to the another end of the first linkage bar 351 by a ninth pivot 3433. The ninth pivot 3433 is coaxial with the fourth pivot 3431, and the ninth pivot 3433 passes through a second guiding rail 327 of the first sliding cover 32 to be moved in the second guiding rail 327; wherein the first pivot and second pivot may also be provided on the base; the first and second pivoting holes may also be respectively provided on the first linkage bar and the second linkage bar, the connections between these two linkage bars and base, the third linkage member can be carried out by means other than the use of pivoting, and they are also be connected in a way of corresponding protruding-recessing structures.

The first linkage member 341 is further connected to a first casing 95 by a connecting block 37, providing space for and protecting the movements of the left four-linkage-mechanism 3 and the swinging member 36, and also enabling the first linkage bar 351 and the first linkage member 341 further connected to the first casing 95 by the connecting block 37 to provide space and to simultaneously protect the movements of the left four-linkage-mechanism 34, the right four-linkage-mechanism 35 and the swinging member 36, thereby when the first sliding mechanism 3 and the base 2 are relatively rotated in an opposite direction to move the left and right four-linkage-mechanisms, so as to have the first casing 95 slide relative to the first housing 91 simultaneously. Similarly, the second sliding mechanism 4 is further connected to the second housing 92 by the connecting block 37 through the first linkage bar and the first linkage member included in the second sliding mechanism 4, thereby providing space for and protecting the movements of the left and right four-linkage-mechanisms and the swinging member of the second sliding mechanism 42, thereby when the second sliding mechanism 4 and the base 2 are relatively rotated to move the left and right four-linkage-mechanisms of the second sliding mechanism 4, so as to have the second casing 96 slide relative to the second housing 92 simultaneously.

One end of the swinging member 36 has a first lever 361 and a fifth pivot 362. The first lever 361 is passed through the first curved rail 3412 of the first linkage mechanism 341, and then is inserted in the first limiting portion 320 that is connected to the first sliding cover 32. The fifth pivot 362 is pivotally connected to the first linkage member 341 such that the first lever 361 is moved along the first curved rail 3412 with the fifth pivot 362 as a rotation center. Because the fifth pivot 362 passes through the first guiding rail 329, the fifth pivot 362 moves in the first rail 329 when the first lever 361 pushes the first sliding cover 32. Another end of the swinging member 36 is provided with a second lever 363 and a Nth pivot 364. The second lever 363 is coaxial with the first lever 361. The second lever 363 is passed through the second curved rail 3512 of the first linkage bar 351, and is inserted into the second limiting portion 328 that is connected to the first sliding cover 32. The Nth pivot 364 is coaxial with the fifth pivot 362. The Nth pivot 364 is pivotally connected to the first linkage bar 351 such that the second lever 363 moves along the second curved rail 3512 with the Nth pivot 364 as a rotation center. Since the Nth pivot 364 passes through the second guiding rail 327, the Nth pivot 364 is moved in the second guiding rail 327 when the second lever 363 pushes the first sliding cover 32. In addition, the center of the swinging member 36 is provided with a first engaging portion 365 coaxial with the fifth pivot 362 and the Nth pivot 364, and the first engaging portion 365 is engaged with the second engaging portion 3432, thereby allowing the swinging member 36 to be turned synchronously with the third linkage member 343 and the first lever 361 is synchronously moved along the first curved rail 3412 of the first linkage member 341 and/or the second curved rail 3512 of the first linkage bar 351 through the swinging member 36, and thus compensation transitions for traveling path and length are formed. Since the first lever 361 and the second lever 363 at two ends of the swinging member 36 simultaneously press the first limiting portion 320 and the second limiting portion 328 respectively, the first sliding cover 32 can be pushed to form a stable linkage effect so as to have the first sliding cover 32 moved along a linear sliding path during the turning process.

Therefore, the movement of the support portion 332 can be restricted via the step portion 23 on two sides of the base 2 to support the flexible display 93 upwardly and have the first housing 91 and the second housing 92 in unfolded state. At this time, the elastic members 326 of the first sliding mechanism 3 and the second sliding mechanism 4 are respectively compressed to accumulate elastic force. As shown in FIGS. 8-11, when the first housing 91 and the second housing 92 are relatively rotated in an opposite direction, two sets of left four-linkage-mechanism 34 and right four-linkage-mechanism 35 are simultaneously moved to have two swinging members 36 rotated so as to move the two first sliding covers 32 and the two supporting members 33. After the two first sliding covers 32 are moved in the opposite direction, the two supporting portions 332 can be separated from the limitation of the step portion 23 at the two sides of the base 2, and then the two support members 33 produce seesaw-like function by the elastic restoring force of the two elastic members 326, and the two support portions 332 are relatively moved by an angle to form an accommodating space 94 to accommodate the curved central part of the flexible display 93.

Accordingly, the present invention has the following advantages:

1. In the folding process, the present invention continuously moves the sliding cover and the housing through the four-linkage-mechanism, the gear set and the lever to generate displacement, and a compensation transition of the traveling path and the length are formed during displacement and rotation to compensate the difference between the radius of curvature formed by the folded portion of the flexible display and the radius of curvature between the two housing, so as to move the two support portions to be offset in an opposite direction to accommodate the curved central part of the flexible display. Therefore, such arrangement can effectively reduce the spacing between the first housing and the second housing when the device of the present invention is folded, so as to reduce the overall volume to be advantageous for the design, thereby it is able to achieve the market demand of being thinner, and a stable transmission effect can be formed due to the overall thickness of the structure is reduced.

2. The support member of the present invention can produce a free swinging function similar to the seesaw when the device of the present invention is folded and unfolded without the need to be pivoted by using a conventional shaft as in prior art. Therefore, when the device of the present invention is folded, the accommodating space can be formed to accommodate the curved central portion of the flexible display, and when the device of the present invention is unfolded, stable support can be provided with for the unfolded central part of the flexible display.

The description referred to in the drawings and stated above is only for the preferred embodiments of the present invention. Many equivalent variations and modifications can still be made by those skilled in the field of the present invention without departing from the spirit of the present invention, so they should be regarded to fall into the scope defined by the appended claims.

What is claimed is:

1. A hinge module for a foldable type device, having one end surface simultaneously connected with a flexible display to have the flexible display relatively folded; the hinge module comprising a base and a first sliding mechanism, where one end of the base has a first pivoting hole and a second pivoting hole; the first sliding mechanism comprising:
   a first sliding cover, one end of which has a limiting space, and another end of which has a first limiting part;
   a supporting member, one end of which is elastically limited by way of sliding along a curved path in the limiting space, and another end of which has a supporting part;
   a four-linkage-mechanism, including a first linkage member, a second linkage member, and a third linkage member; where one end of the first linkage member is pivotally connected to the first pivoting hole by a first pivot, one end of the second linkage member is pivotally connected to the second pivoting hole by a second pivot, and another end of the second linkage member is pivotally connected to one end of the third linkage member by a third pivot, another end of the third linkage member is pivotally connected to another end of the first linkage member by a fourth pivot; and
   a swinging member, coupled to the third linkage member in a synchronous rotation, and one end of the swinging member is provided with a first lever, and the first lever passes through the first linkage member and is connected to the first limiting part of the first sliding cover; thereby when the first sliding mechanism and the base are rotated to move the four-linkage-mechanism, the first sliding cover is moved to offset the supporting part of the supporting member by an angle, so as to accommodate a curved part of the flexible display in a folded position.

2. The hinge module for a foldable type device according to claim 1, wherein another end surface of the hinge module is respectively connected to a first housing and a second housing for moving the first housing and the second housing in a linkage way, so as to have the first housing and the second housing rotated in an opposite direction; the base is located between the first housing and the second housing; the four-linkage-mechanism is a left four-linkage-mechanism, the first sliding cover is connected to the first housing; when the first sliding mechanism and the base are relatively rotated to move the left four-linkage-mechanism, the first sliding cover is moved in a linkage way to move the first housing synchronously.

3. The hinge module for a foldable type device according to claim 2, wherein the first sliding cover includes a first cover body and a first sliding block, the first cover body is connected to the first housing, the first sliding block has the limiting space, and the limiting space includes a limiting slot and a curved guiding slot in communication with each other, the limiting slot is provided with an elastic member therein, and the supporting member has a first curved rail for correspondingly being located in the curved guiding slot to relatively slide along a curved path, one end of the first curved rail is connected to the supporting part, and another end of the first curved rail has a hook portion for pressing against and limiting the elastic member, and the first linkage member is further connected to a first casing by a connecting block for providing space and protecting the movements of the left four-linkage-mechanism and the swinging member; thereby when the first sliding mechanism and the base are relatively rotated to move the left four-linkage-mechanism, the first casing is slid relative to the first housing.

4. The hinge module for a foldable type device according to claim 1, wherein another end of the first sliding cover has a first guiding rail through which the fourth pivot passes and which guides the fourth pivot.

5. The hinge module for a foldable type device according to claim 4, wherein the swinging member is pivotally connected to the first linkage member by a fifth pivot, and the fifth pivot passes through the first guiding rail and which guides the fifth pivot.

6. The hinge module for a foldable type device according to claim 5, wherein the swinging member has a first engaging portion that is coaxial with the fifth pivot, the third linkage member has a second engaging portion that is coaxial with the fourth pivot, the second engaging portion is engaged with the first engaging portion to have the third linkage member turned synchronously together with the swinging member.

7. The hinge module for a foldable type device according to claim 1, wherein one side of the base has a step portion for restricting the supporting part from being offset by an angle.

8. The hinge module for a foldable type device according to claim 1, wherein another end of the first linkage member has a first curved rail for accommodating and limiting the first lever of the swinging member.

9. The hinge module for a foldable type device according to claim 1, further comprising a second limiting part, another four-linkage-mechanism and a second lever, where the second limiting part is located at another end of the first sliding cover; the another four-linkage-mechanism includes a first linkage bar and a second linkage bar, one end of the first linkage bar is pivotally connected to the first pivot hole by a sixth pivot, and one end of the second linkage bar is pivotally connected to a second pivot hole by a seventh pivot, another end of the second linkage bar is pivotally connected to one end of the third linkage member by an eighth pivot, and another end of the third linkage member is pivotally connected to another end of the first linkage bar by a ninth pivot, the ninth pivot is coaxial with the fourth pivot; the second lever is located at one end of the swinging member, the second lever is coaxial with the first lever, the second lever passes through the first linkage bar and connects to the second limiting part of the first sliding cover.

10. The hinge module for a foldable type device according to claim 9, wherein another end surface of the hinge module is respectively connected to a first housing and a second housing for moving the first housing and the second housing in a linkage way, so as to have the first housing and the second housing rotated in an opposite direction; the base is located between the first housing and the second housing; the four-linkage-mechanism is a left four-linkage-mechanism, and the another four-linkage-mechanism is a right four-bar mechanism, the first sliding cover is connected to the first housing; thereby when the first sliding mechanism and the base are relatively rotated to move the left and right four-linkage-mechanisms, the first sliding cover is moved in a linkage way together with the first housing.

11. The hinge module for a foldable type device according to claim 10, wherein the first sliding cover includes a first cover body and a first sliding block, the first cover body is connected to the first housing, the first sliding block has the limiting space, and the limiting space includes a limiting slot and an curved guiding slot in communication with each other, the limiting slot has an elastic member, and the supporting member has a first curved rail for correspondingly being accommodated in the curved guiding slot in a sliding way along a curved path, one end of the first curved rail is connected to the support part, and another end of the first curved rail has a hook portion for pressing against and limiting the elastic member, and the first linkage bar and the first linkage member are further connected with a first casing by a connecting block for providing space and protecting the actions of the left four-linkage-mechanism, the right four-linkage-mechanism and the swinging member; thereby when the first sliding mechanism and the base are relatively rotated to move the left and right four-linkage-mechanisms, the first housing is slid relative to the first casing.

12. The hinge module for a foldable type device according to claim 9, wherein one end of the first sliding cover has a second guiding rail through which the ninth pivot passes and which guides the ninth pivot.

13. The hinge module for a foldable type device according to claim 12, wherein the swinging member pivotally connects the first linkage bar with an Nth pivot, the Nth pivot is coaxial with the fifth pivot, and the Nth pivot passes through the second guiding rail, and by which the Nth pivot is guided.

14. The hinge module for a foldable type device according to claim 9, wherein another end of the first linkage bar has a second curved rail for accommodating and limiting the second lever of the swinging member.

15. The hinge module for a foldable type device according to claim 9, wherein the sixth pivot is coaxially connected to a first gear.

16. The hinge module for a foldable type device according to claim 15, further comprising a second sliding mechanism, wherein the second sliding mechanism and the first sliding mechanism are symmetrically provided at two ends of the base, and the second sliding mechanism has a second gear for engaging the first gear, so as to have the second sliding mechanism rotated in an opposite direction relative to the first sliding mechanism.

17. The hinge module for a foldable type device according to claim 1, further comprising a second sliding mechanism, wherein the second sliding mechanism is structurally corresponding to the first sliding mechanism, and the second sliding mechanisms and the first sliding mechanism are symmetrically provided at two ends of the base.

* * * * *